United States Patent
O'Meara, Jr.

[11] 3,744,302
[45] July 10, 1973

[54] SPATIALLY COHERENT SONIC WAVE OBJECT INSPECTION DEVICE

[75] Inventor: Thomas R. O'Meara, Jr., Malibu Beach, Calif.

[73] Assignee: Hughes Aircraft Company, Culver City, Calif.

[22] Filed: Aug. 25, 1966

[21] Appl. No.: 575,114

[52] U.S. Cl................... 73/67.7, 340/3 R, 350/3.5, 181/0.5 R
[51] Int. Cl. ............................................ G01n 9/24
[58] Field of Search ................ 73/67.5–67.9, 432 L; 340/5 H; 350/3.5

[56] References Cited
UNITED STATES PATENTS

| | | | |
|---|---|---|---|
| 2,164,125 | 6/1939 | Sokoloff.......................... | 340/5 MP |
| 3,400,363 | 9/1968 | Silverman............................. | 340/3 |
| 2,832,214 | 4/1958 | Trommler............................. | 73/67.6 |
| 3,199,069 | 8/1965 | Lord et al......................... | 73/676 X |
| 3,213,675 | 10/1965 | Goldman ............................. | 73/67.5 |

OTHER PUBLICATIONS

Y. N. Denisyuk, Photographic Reconstruction of the Optical Properties of an Object in Its Own Scattered Radiation Field, Soviet Physics, Dec. 1962, p. 543–545.

E. N. Leith et al., Wavefront Reconstruction With Continuous–Tone Objects, J.O.S.A., Dec. 1963, p. 1377–1381.

G. W. Stroke, Lensless Photography, International Science and Technology, May 1965, p. 52–60 and 85.

P. Gregus, Ultrasound Holograms, Research Film, Vol. 5, No. 4, Dec. 1965, P. 330–337.

Leith, E. N. et al., Photograpy by Laser, Scientific American, June 1965, Vol. 212, No. 6, p. 24–35.

Leith, E. N. et al., Holograms: Their Properties and Uses, S.P.I.E. Journal, Oct.–Nov. 1965, Vol. 4, p. 3–6.

*Primary Examiner*—Richard C. Queisser
*Assistant Examiner*—John P. Beauchamp
*Attorney*—James K. Haskell and Robert Thompson

[57] ABSTRACT

A system for inspecting the surface and internal three-dimensional aspects of a solid object by directing a beam of spatially coherent sonic wave energy so that a portion of the wave energy which penetrates the object is reflected from interfaces between density discontinuities therein and is directed toward a recording plane as an object beam. Another portion of the beam of spatially coherent sonic wave energy is reflected directly from a reflecting surface and directed to the recording plane as a reference beam. The object beam and the reference beam form an interference fringe pattern at the recording plane which is recorded on a transparency. Thereafter, three dimensional images of the object can be reconstructed by directing a laser beam through the transparency and looking through the transparency.

5 Claims, 6 Drawing Figures

PATENTED JUL 10 1973 3,744,302

INVENTOR.
Thomas R. O'Meara,

Robert Thompson
ATTORNEY.

SPATIALLY COHERENT SONIC WAVE OBJECT INSPECTION DEVICE

This invention relates generally to inspection and testing, and particularly, to a means for inspecting the three-dimensional aspects of a solid object by using a beam of spatially coherent sound wave energy.

In some technologies, solid objects need to be inspected or detected in a non-destructive manner. This has been done by subjecting a volume containing the object and its environment to a beam of sonic wave energy and then detecting any deviations in the reflected sonic wave energy which are indicative of discontinuities in the density of the volume through which the beam of sonic wave energy is directed.

The three-dimensional surface aspects of objects have been recorded in systems that utilize a beam of spatially coherent light. In practice, one portion of the laser beam illuminated the object and was reflected from the object's surface to a high resolution photographic film as an object beam. A second portion of the beam of coherent light which did not illuminate the object was reflected directly from a mirror to the photographic film as a reference beam. The object beam and the reference beam created an interference fringe pattern which was recorded on a photographic film.

To reproduce an image of the object, it was necessary to illuminate the developed film with a laser beam, whereupon, a real image and a virtual image were reconstructed in space off of the beam axis. Since the reproduced images were derived from the phase information and the intensity information corresponding to the object's three-dimensional aspects, the images exhibited observable three-dimensional characteristics, such as: parallax; visual depth; and perspective.

An object of this invention is to provide a means for recording the three-dimensional characteristics of either the surface aspects or the interior aspects of an object or in some cases both.

Another object is to inspect and observe solid objects with a system featured by a means for generating a spatially coherent sonic wave energy.

Other objectives, features, and advantages can be attained by providing a system featured by a means for generating a beam of spatially coherent sonic wave energy and a tank containing a liquid. The beam is directed into the tank so that a portion of the beam strikes an object immersed within the liquid. For the purposes of examining interior aspects of the object, the liquid should substantially match the sonic impedance of the object, thereby decreasing the reflected sonic energy at surface interfaces between liquid and object. As a result, a significant portion of the coherent sonic wave energy will penetrate the object and be reflected from interior density discontinuities of the various matters within the object. The phase and the intensity of the reflected coherent sonic wave energy is representative of the sound absorbing and reflecting characteristics of the reflecting matter and its spatial position. That portion of the coherent sonic energy reflected from the object and which is directed to a recording plane is referred to as an object beam.

In addition, a portion of the beam of spatially coherent sonic wave energy is also reflected directly from a reflecting surface to the recording plane as a reference beam, whereat it combines with the subject beam to create an interference fringe pattern.

The interference fringe pattern can be recorded electronically, such as by an electron beam scan of the recording plane by a cathode ray tube and recording the resulting video on a transparency by photography, to provide a hologram.

Thereafter, the image of the object can be reconstructed by illuminating the hologram with a beam of spatially coherent light, whereupon, a real image and a virtual image are reconstructed in space off of the beam axis. Since the reproduced image is derived from both the phase information and the intensity informtion of the object reflected beam, the image will exhibit observable three-dimensional characteristics, such as parallax, visual depth, and perspective.

Other objects, features, and advantages of this invention will become apparent upon reading the following detailed description and referring to the accompanying drawings, in which.

Figure 1:
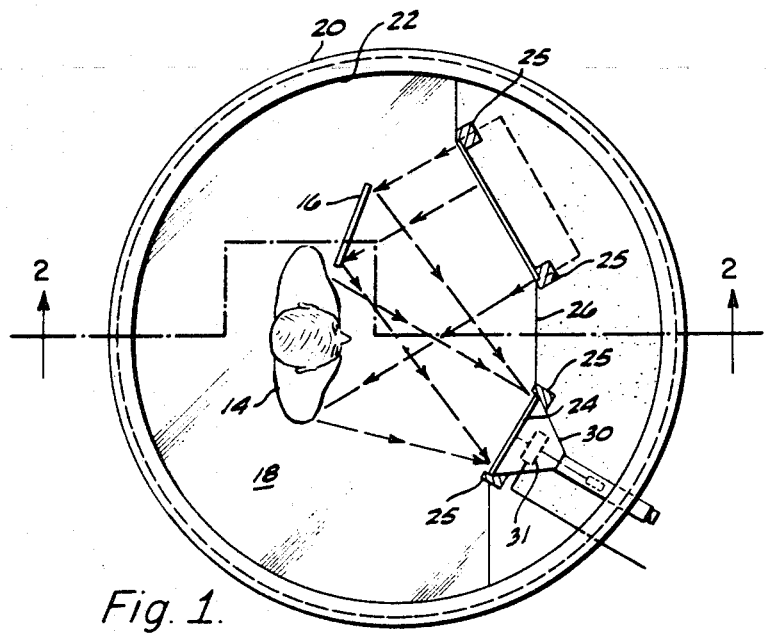
FIG. 1 is a top plan view of an embodiment of the holographic device featured by a means for generating coherent sonic wave energy which is directed to an object, and a reflecting member, and is reflected to a recording plane as an object beam and a reference beam.
Figure 3:
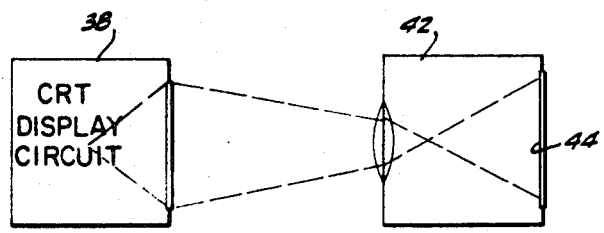
FIG. 3 is a block diagram illustrating an apparatus consisting of a conventional cathode ray tube display circuit and camera system which will process and record the interference fringe pattern electronically and photographically.

Referring now to an embodiment, in FIG. 1 of the drawings, there is illustrated an inspection system featured by a means 12 for generating a beam of spatially coherent sonic wave energy which is directed toward an object 14 to be inspected, and to a sound reflecting member 16 through a liquid medium 18 contained within a tank 20. Hereinafter it should be understood that the terms sonic and sound are intended to encompass both the audible and ultrasonic ranges of frequencies. In order to reduce undesirable reflections, the inner wall 22 of the tank 20 is made anti-reflecting or nonreflecting.

By a proper selection of frequency of the spatially coherent sonic or ultrasonic wave energy and the liquid 18, a significant portion of the coherent sonic wave energy will penetrate the object to a desired depth and be reflected from the interfaces of any density discontinuities within the object. A portion of spatially coherent sonic wave energy reflected from materials of the object 14, hereinafter referred to as an object beam, contains phase information and intensity information corresponding to the physical characteristics and the spatial position of the reflecting matter within the object.

Another portion of the beam of spatially coherent sonic wave energy is directed to a recording plane 24 by a reflecting member 16 and is hereinafter referred to as a reference beam. The reference beam contains the phase and the intensity information of the original beam of spatially coherent sonic wave energy since its intensity and phase remain substantially uniform at the recording plane 24.

The object beam and the reference beam are simultaneously received at a recording plane 24 which is responsive to the reflected sonic wave energy whereat they are in effect simultaneously recorded as a sonic interference fringe pattern.

Figure 2:
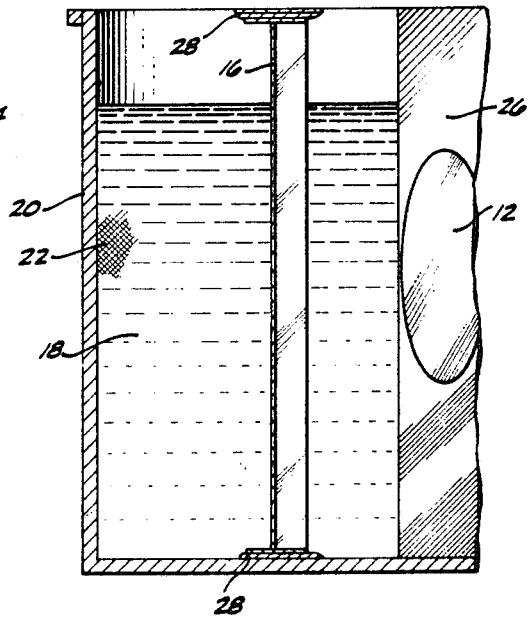
FIG. 2 is a cross-sectional, side-elevational view taken along the line 2—2 of FIG. 1.

Considering the structure and the operation of the system illustrated in FIGS. 1 and 2 in more detail, the tank 20 can be of substantially cylindrical shape and have a diameter and height large enough to form a chamber that will contain the object 14. The tank is made of some material, such as metal, which has sufficient strength to support the weight of the liquid 18 and the object 14, along with a member 26 which supports the sound generator 12 and the recording plane 24 in sound isolation.

The sound generator 12 can be a planar piezoelectric transducer capable of generating spatially coherent and essentially collimated sonic wave energy at a desired frequency. The sonic wave can have a frequency within the range between 2 kHz to 30 mHz, an especially attractive frequency being of the order of 50 kHz. Operationally, the exact frequencey used is a matter of choice. For example, lower frequency sound waves will provide better penetration of the object, but a lower resolution. Conversely, a higher frequency signal will provide a higher resolution but with less penetration. Conventional sound generators of the type that can be used are the magnetostrictive transducers described in *Elements of Acoustical Engineering*, Second Edition, by Olson, published by Van Nostrand, pp. 515–520.

Both the sound generator 12 and the recording plane 24, are mounted by acoustic decoupling members 25 on a support member 26 which is in turn secured to the wall of the tank 20. In operation, the acoustic decoupling material prevents the sonic wave energy from being transmitted from the sound generator 12 to the tank wall, where reflection could be set up. One type of material that will perform this function is known as pc rubber, a sound absorbing rubber whose acoustic impedance approximates that of water where p is the density of the rubber and c is the propagation velocity of sound in the rubber. Reference to materials of this type is made in *Elements of Acoustical Engineering*, 2nd Edition, by Olson, published by Van Nostrand, pp. 401–410.

The beam of spatially coherent sonic wave energy is directed through the fluid 18 toward an object 14 and a sound reflecting member 16 located within the tank 20, from which it is reflected. To suppress background reflections, the inner wall 22 of the tank 20 is made nonreflecting or anti-reflecting by means of a nontransmitted or sound absorbing rubber coating. A surface having a crisscross network of protruding pyramidal members or other sound entrapping surfaces on the coating is advantageous in further reducing background reflections. An advantage of this structure is that only the spatially coherent sonic wave energy reflected from the object 14 and the surface of the sound reflecting member 16 will be received at the recording plane 24.

The liquid 18 operates as a transmission medium for the beam of spatially coherent sonic wave energy and as a means for significantly reducing the reflecting interface at the surface of the object 14 which would normally occur if the object were immersed in a greatly dissimilar bath, such as gas. For example, if a human body is the object 14 to be holographed, a liquid 18 that should be used in water, or a homogeneous mixture of water and salt or other soluble contaminant, since the human body is comprised mostly of water. In view of the general availability of water, it could also be satisfactory for matching the reflecting interface of other solid objects. Of course, for objects having a high density such as metal, a homogeneous, high-density liquid such as mercury could be used.

The object 14 to be holographed, as illustrated in FIG. 1, can be a human body which is positioned near a sound reflecting member 16. A portion of the beam of spatially coherent sonic wave energy strikes and penetrates the object 14. As a result of the differences between the mass, density, and matter of certain tissue, such as muscle, bone, etc., the wave energy reflected from the interfaces between the different density discontinuities within the body will be at different intensities. In addition, because of the spatial position of the organs and matter, the phase of the reflected sonic wave energy will also correspond to the spatial position of the matter. Although the reflected wave energy will be radiated in many directions, only that portion of the wave energy which is reflected toward the recording plane 24 is of interest and is illustrated by the dashed line containing arrowheads. This portion of the sonic wave energy is referred to as the object beam.

The sound absorbing and anti-reflecting nature of the tank wall 22 and the sound-isolating mass 26 are sufficient to suppress the effect of any other undesirable reflected wave energy.

A portion of the beam of spatially coherent sonic wave energy generated by the sound generator 12 is directed to the reflecting surface of member 16 whereat the angle of reflection is sufficient to direct this sonic wave energy to the recording plane 24 without undesirably affecting its phase or intensity. One way that this can be done is to form the reflecting surfaces 16 as elongated members secured between the top and the bottom walls of the tank by means of sound isolating pads 28 made of the previously referenced pc rubber as illustrated in FIG. 2. The surface of the reflecting member 16 is smooth and flat and located so that the beam of spatially coherent sonic wave energy is reflected through the liquid 18 to the recording plane 24 without striking any intermediate objects. A material that could be used is polished steel or other smooth surfaced material of appreciably different acoustical impedance than water and as a result is highly reflective of sound waves. This spatially coherent sonic wave energy reflected from the reflecting member 16 is referred to as a reference beam, since it provides a phase reference and intensity reference relative to the spatially coherent sonic wave energy generated by the sound generator 12.

As a result of the object beam and the reference beam simultaneously impinging upon the recording plane 24, a sonic interference fringe pattern is created thereat which can be recorded to produce a hologram.

The recording plane 24 is operable to transfer the interference fringe pattern created at its surface to a holographic transparency, where it is recorded. the member the member, conventional One structure that will accomplish this transfer operation includes a cathode ray tube 30 having at its face a flat planar member 24 of piezoelectric material. In operation, the sonic wave energy focused on one surface of the member 24 gives rise to a distribution of electrical potential at the opposite face of the member, which, as a result of the piezoelectric properties of the material, is an exact replica of the incident sound pressure distribution. This face having the distribution of electrical potential is scanned by a beam of primary electrons in the cathode ray tube 30, such as in a conventiona horizontal raster scan pattern. The secondary electrons scattered from the piezoelectric member 24 are collected during the scanning at a 31 collector as a collector current. The collector current varies sympathetically with the distribution of electrical potential at the member 24, since this current is dependent upon the potential difference between the collector electrode 31 and the scanned surface of the piezoelectric material 24, and thus forms a video signal. One device that could be used to accomplish this operation is described in the *Proceedings of the National Electronics Conference*, Vol. 18, 1962, in an article entitled, "New Developments in Underwater Sound Generation and Detection," by Roy R. Whymark, pp. 741 and 742.

The video signal from the collector 31 is processed using video electronics 38 to obtain an image of the interference fringe pattern at the face of a cathode ray tube 40. Conventional electronic circuits that could be used to perform this operation described and illustrated in "Television" by Zworykin and Morton, Second Edition, especially pp. 278–290, wherein light valve cathode ray tubes are described.

A holographic transparency is made of the image electronically constructed at the face of cathode ray tube 40 by means of a camera 42 which is illustrated schematically. The camera 42 can be of any conventional type having good optics which does not significantly distort the interference fringe pattern. The film 44 within the camera is exposed to the image of the interference fringe pattern and can generally be of any conventional type. After the film 44 is exposed, it is developed and processed for recording the interference fringe pattern as a holographic transparency, after which it will generally be reduced according to the scaling law $$m = \lambda_o/\lambda_c$$

where
 $m$ = a scaling factor
 $\lambda_o$ = the wavelength of a spatially coherent playback light beam; and
 $\lambda_a$ = the wavelength of the spatially coherent sonic energy.

When this image is reduced, a high resolution film can be used such as 649-F Spectroscope Plate, V-F Spectroscope Plate, and High Contrast Copy (microfilm), all made by the Eastman Kodak Co. It should of course be understood that other photographic films could be utilized, including roll film and plate film.

Referring now to the scaling factor characteristics in more detail, since the wavelength of the playback light beam $\lambda_o$ must necessarily be in the visible region and since the wavelength of the sonic energy $\lambda_a$ used for recording must necessarily be chosen for a particular task, to yield a desirable combination of penetration and resolution capability, it follows that these wavelengths must in general be unequal. In such cases it has been shown that one must employ particular combinations of film size (or scaling) and beam geometries if distortion free playback is to result. As a particular example gross differences in lateral and longitudinal magnification may result unless th playback film pattern is scaled to correct size and as a result the three dimensional quality of holography may thereby essentially be lost. Further description of scaling factor characteristics is contained in *Journal of the Optical Society of America*, Vol. 55, No. 8, August, 1965, in an article entitled, "Third Order Aberrations in Holography," by Meier, R. W.

As previously stated, if $\lambda_a$ is the acoustical wavelength in the transmission media employed, and $\lambda_o$ is the optical wavelength of the spatially coherent light, then the playback film must be reduced (or magnified) in linear dimensions by the ratio $$m = \lambda_o/\lambda_a$$

compared to the original recording (tube face) linear dimensions. Although the information of the acoustical hologram or its picture need not be reproduced with great precision with reasonably large values of $\lambda_o$, the reduction process must be of the highest quality. Further, both the reference acoustical beam (on recording) and the optical beam (on playback) should be well collimated (essentially parallel). Thus the dimensions of the acoustical source should be large relative to the wavelength of the sonic energy $\lambda_a$.

Figure 4:
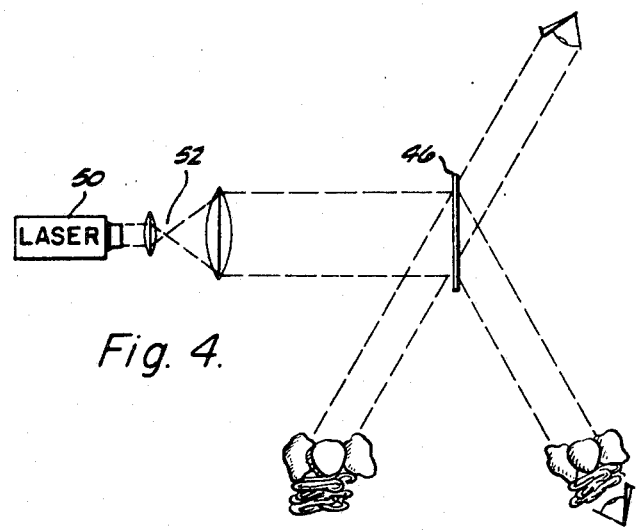
FIG. 4 is a schematic illustration of a structure that will reconstruct a real and a virtual image of the reflecting object by directing spatially coherent light through the holograph.

To reconstruct or playback three dimensional images of the object 14 that was holographed, as illustrated in FIG. 4, a transparency or holograph 46 that is obtained by developing and processing the film 44 is subjected to a beam of spatially-coherent laser light generated by a continuous wave single mode laser 50. Where necessary, the beam of laser light is directed through a telescope 52, which spreads the beam and recollimates it at a larger diameter, whereupon the beam is directed through the holographic transparency 46.

Figure 5A:
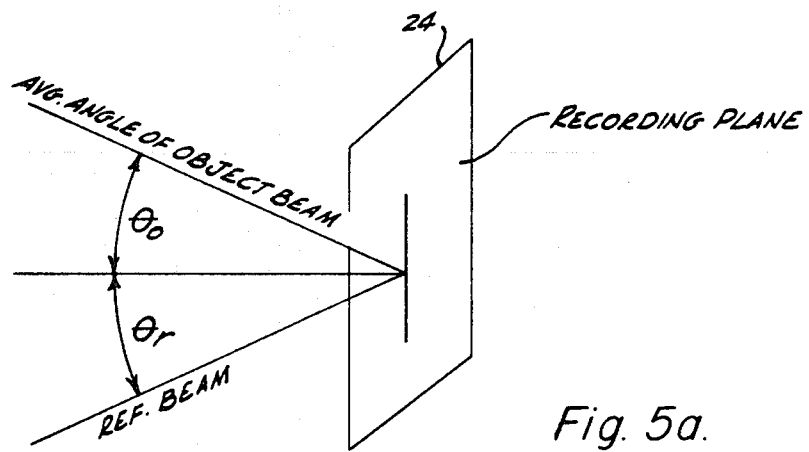
FIG. 5a and 5b schematically illustrate certain angles of the beams relative to the recording plane and the playback plane respectively.
Figure 5B:
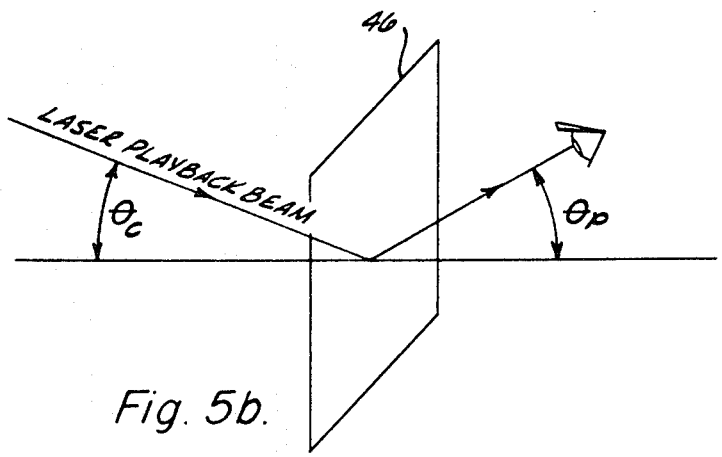

Furthermore to avoid distortion, certain angles should be employed for recording and playback as noted in FIGS. 5a and 5b. For example, the angle $\theta_r$ of the sonic reference beam on recording and the angle $\theta_c$ of the spatially coherent laser light on playback must be equal and opposite to one another relative to recording and playback plane normals.

When an observer looks through the transparency 46 at a proper range of angles, indicated generally as $\theta_p$, a real image and a virtual image are reconstructed in space off of the beam axis. The images are essentially the same image as would have been seen by an eye sensitive to the sonic wave energy where looking at the object from the viewpoint of the recording plane 24 of FIG. 1. These images exhibit certain observable characteristics such as: parallax between near and far elements of the image which are exactly that parallax which occurs when viewing the original object, perspective change in the image as the observer's eye is repositioned in space when looking through the holographic transparency 46 at various angles, and visual depth which requires an observer to refocus his eyes when shifting his observation from a near portion of the image to a more distant portion, and vice versa. An advantage in this is that the observer can reposition his eye to look behind organs, etc.

Although an embodiment has been illustrated wherein the object 14 to be holographed is described and illustrated as a human body located within a tank 20, it should be understood that other applications are possible. For example, the holograph could prove useful for searching silty river bottoms or lakes, where limited visibility prohibits optical searches. In addition, internal inspection for flaws within castings or solid objects could have considerable advantages, since conventional techniques use simple reflectivity which gives one dimensional information only. An advantage of the three dimensional inspection features of this invention is that more information is recorded per unit area of recording plane, and consequently, greatly enhanced results are attained.

What is claimed is:

1. A system for inspecting objects immersed within a homogeneous liquid medium having a mechanical impedance closely related to that of the object, comprising:

means for operating a beam of spatially coherent sonic or ultrasonic wave energy, a portion of the beam being directed to the object;

reflector means adapted to directly receive and directly reflect a portion of the beam of spatially coherent sonic or ultrasonic wave energy as a reference beam; and recorder means adapted to receive and record the spatially coherent sonic or ultrasonic wave energy reflected from said reflector means and to receive and record spatially coherent sonic or ultrasonic wave energy reflected from matter within the object in the form of an interference fringe pattern.

2. The combination of claim 1 in which said recording means includes means for recording the interference fringe pattern on a transparency.

3. The combination of claim 2 further including means for generating a beam of spatially coherent light, said means being operable to direct the spatially coherent light through said transparency for reconstructing an image of the object.

4. The combination of claim 1 in which said recorder means is adapted to receive and record spatially coherent sonic or ultrasonic wave energy from the interface between density discontinuities of the object.

5. A system for inspecting an object comprising:

tank means forming a hollow chamber and having chamber walls of acoustically nonreflecting material;

a homogeneous liquid medium contained within said tank chamber and surrounding the body said liquid having a mechanical impedance that is closely related to the mechanical impedance of the object;

a reflecting member mounted within said tank and immersed within said liquid, said reflecting member having a planar reflecting surface;

transducer means for generating a beam of spatially coherent sonic or ultrasonic wave energy being mounted within said tank and being operable to direct one portion of the beam to the object and another portion of the beam to said reflective surface;

a recorder means including a cathode ray tube having a planar sound responsive face member of piezoelectric material which is mounted within said tank for receiving the spatially coherent sonic or ultrasonic wave energy reflected from said reflector means and from the interface between matter density discontinuities within the object as an interference fringe pattern, said cathode ray tube being operable to electrically scan said face member for generating a video signal corresponding to the interference fringe pattern impinging thereat;

a means for converting said video signal to a video display;

a photographic means for recording the video display of the interference fringe pattern on a transparency; and laser means for generating a beam of spatially coherent light, said laser means being operable to direct the spatially coherent light through said transparency for reconstructing a three-dimensional image of the exterior and interior aspects of the object.

* * * * *

UNITED STATES PATENT OFFICE
CERTIFICATE OF CORRECTION

Patent No. 3,744,302   Dated July 10, 1973

Inventor(s)   Thomas R. O'Meara, Jr.

It is certified that error appears in the above-identified patent and that said Letters Patent are hereby corrected as shown below:

Column 4, line 3, "in" should be --is--, and lines 63 and 64, cancel "the member the member, conventional". Column 5, line 27, after "operation" insert --are--. Column 6, line 3 "th" should be --the--. Column 7, line 17, "operating" should be --generating--. Column 8, line 40, insert the following claims.

6. The combination of claim 1 in which said recording means includes transducer means having a sound responsive face disposed for receiving the reflected sonic or ultrasonic wave energy and converting the sonic or ultrasonic energy directly to electrical energy.

7. The combination of claim 6 in which said transducer comprises a planar member having a first surface for receiving the sonic or ultrasonic wave energy and responsive thereto to produce a fringe pattern of distribution of electrical potential on another surface corresponding to the distribution of sonic or ultrasonic wave energy on the first surface.

8. The combination of claim 7 in which the transducer planar member comprises piezoelectric material and the transducing is provided by piezoelectric properties of the material.

9. The combination of claim 7 in which means are provided for converting the pattern of distributed electrical potential on said another surface to a visual display.

UNITED STATES PATENT OFFICE
CERTIFICATE OF CORRECTION

Patent No. 3,744,302  Dated July 10, 1973

Inventor(s) Thomas R. O'Meara, Jr.

It is certified that error appears in the above-identified patent and that said Letters Patent are hereby corrected as shown below:

10. The combination of claim 9 in which the means for converting the pattern of distributed electrical potential to a visual display includes means for producing a beam of primary electrons to provide secondary electrons scattered from said another surface, said secondary electrons being collected to provide a current varying from point-to-point with the area being scanned according to the distribution of the electrical potential on said another surface.

11. The combination of claim 9 in which the means for converting the pattern of distributed electrical potential to a visual display comprises a cathode ray tube having said transducer as a face member.

12. The combination of claim 9 in which said latter means for converting the pattern of distributed potential to visual display comprises means for producing a video signal and means are provided for receiving said video signal to produce a visual display.

On the cover sheet, after the abstract, "5 Claims" should read -- 12 Claims --.

Signed and sealed this 1st day of October 1974.

(SEAL)
Attest:

McCOY M. GIBSON JR.
Attesting Officer

C. MARSHALL DANN
Commissioner of Patents